(12) United States Patent
Armstrong

(10) Patent No.: US 12,264,301 B2
(45) Date of Patent: Apr. 1, 2025

(54) METHOD OF BREWING NON-ALCOHOLIC BEER

(71) Applicant: COORS BREWING COMPANY, Milwaukee, WI (US)

(72) Inventor: Keith Armstrong, Toronto (CA)

(73) Assignee: COORS BREWING COMPANY, Milwaukee, WI (US)

(*) Notice: Subject to any disclaimer, the term of this patent is extended or adjusted under 35 U.S.C. 154(b) by 28 days.

(21) Appl. No.: 17/774,915

(22) PCT Filed: Nov. 6, 2020

(86) PCT No.: PCT/US2020/059300
§ 371 (c)(1),
(2) Date: May 6, 2022

(87) PCT Pub. No.: WO2021/092303
PCT Pub. Date: May 14, 2021

(65) Prior Publication Data
US 2022/0389354 A1  Dec. 8, 2022

Related U.S. Application Data

(60) Provisional application No. 62/933,305, filed on Nov. 8, 2019.

(51) Int. Cl.
C12C 12/04 (2006.01)
C12C 11/00 (2006.01)
(Continued)

(52) U.S. Cl.
CPC ............ *C12C 12/04* (2013.01); *C12C 11/003* (2013.01); *C12C 11/06* (2013.01);
(Continued)

(58) Field of Classification Search
CPC ..................................................... C12C 12/04
See application file for complete search history.

(56) References Cited

U.S. PATENT DOCUMENTS 4,957,767 A 9/1990 Maria de Kort et al.
4,970,082 A 11/1990 Huige et al.
(Continued)

FOREIGN PATENT DOCUMENTS

EP 0424794 5/1991
EP 0307052 7/1991
(Continued)

OTHER PUBLICATIONS

Brányik et al., "A review of methods of low alcohol and alcohol-free beer production", Journal of Food Engineering, 108, (2012), pp. 493-506. (Year: 2012).*

(Continued)

*Primary Examiner* — Elizabeth Gwartney
(74) *Attorney, Agent, or Firm* — Sheridan Ross P.C.

(57) ABSTRACT

Methods and systems are described that produce a nonalcoholic beer. The method includes heating water within a container, adding selected components to the water including at least one salt or at least one acid, bringing the water to a boil, adding selected hops to create a water brew, cooling the water brew, adding a selected percentage of a high krausening wort to the cooled water brew, allowing the wort to complete a fermentation cycle to produce a base product, diluting the base product by a percentage to thereby produce an ABV to at or below 0.5%, and adding at least one flavoring to the base product to produce the nonalcoholic beer.

17 Claims, 1 Drawing Sheet

(51) Int. Cl.
  *C12C 11/06* (2006.01)
  *G06F 16/901* (2019.01)
  *G06F 16/903* (2019.01)
  *G06F 16/904* (2019.01)

(52) U.S. Cl.
  CPC .... *G06F 16/9024* (2019.01); *G06F 16/90335* (2019.01); *G06F 16/904* (2019.01)

(56) References Cited

U.S. PATENT DOCUMENTS

| | | | |
|---|---|---|---|
| 5,612,072 | A | 3/1997 | Lommi et al. |
| 6,689,401 | B1 | 2/2004 | Pfisterer et al. |
| 9,345,260 | B2 | 5/2016 | Berberich et al. |
| 9,848,627 | B2 | 12/2017 | Ito et al. |
| 10,415,007 | B2 | 9/2019 | Saerens et al. |
| 10,544,385 | B2 | 1/2020 | Saerens et al. |
| 2002/0102345 | A1 | 8/2002 | Ramirez |
| 2010/0303994 | A1 | 12/2010 | Aerts |
| 2011/0195149 | A1 | 8/2011 | Kreisz et al. |
| 2012/0225164 | A1 | 9/2012 | Frederiksen et al. |
| 2014/0322427 | A1 | 10/2014 | Teranishi et al. |
| 2015/0118355 | A1 | 4/2015 | Baekgaard et al. |
| 2016/0143339 | A1 | 5/2016 | Nakajima |
| 2018/0135000 | A1 | 5/2018 | Methner et al. |
| 2019/0177672 | A1 | 6/2019 | Hayashi et al. |

FOREIGN PATENT DOCUMENTS

| | | |
|---|---|---|
| EP | 0523333 | 1/1993 |
| EP | 0601362 | 6/1994 |
| EP | 2573160 | 3/2013 |
| EP | 2737810 | 6/2014 |
| GB | 19859 | 12/1898 |
| WO | WO 2010/043538 | 4/2010 |
| WO | WO 2011/058105 | 5/2011 |
| WO | WO 2013/167573 | 11/2013 |

OTHER PUBLICATIONS

"Anchor Terminology: Krausening," Anchor Brewing Blog, Aug. 15, 2012, retrieved from https://www.anchorbrewing.com/blog/anchor-terminology-krausening/, 2 pages.

"How To Make Hop Water—Soda Water With Hops!," Clawhammer Supply, Mar. 29, 2019, retrieved from https://www.clawhammersupply.com/blogs/moonshine-still-blog/how-to-make-hop-water-soda-water-with-hops, 7 pages.

Eddings, "The Definition of 'Krausen' in Beer Brewing," The Spruce Eats, Aug. 15, 2019, retrieved from https://www.thespruceeats.com/homebrewing-krausen-definition-353255, 4 pages.

Macbride, "What's the Deal with 'Zero Alcohol' Beer—Is it Sober-Friendly?," Healthline, Sep. 30, 2019, retrieved from https://www.healthline.com/health/addiction/whats-the-deal-with-zero-alcohol-beer-is-it-sober-friendly, 7 pages.

Pomranz, AB InBev's 'No Boil' Brewing Method Could Mean Greener Beer, Food & Wine, Apr. 11, 2018, retrieved from https://www.footandwine.com/news/no-boil-beer-brewing-ab-inbev, 3 pages.

International Preliminary Report on Patentability for International (PCT) Patent Application No. PCT/US2020/59300, dated May 19, 2022, 8 pages.

International Search Report and Written Opinion prepared by the U.S. Patent and Trademark Office for International (PCT) Patent Application No. PCT/US2020/059300, dated Jan. 5, 2021, 14 pages.

Official Action for Canada Patent Application No. 3157570, dated Feb. 27, 2023, 3 pages.

Notice of Allowance for Canada Patent Application No. 3157570, dated Aug. 4, 2023, 1 page.

* cited by examiner

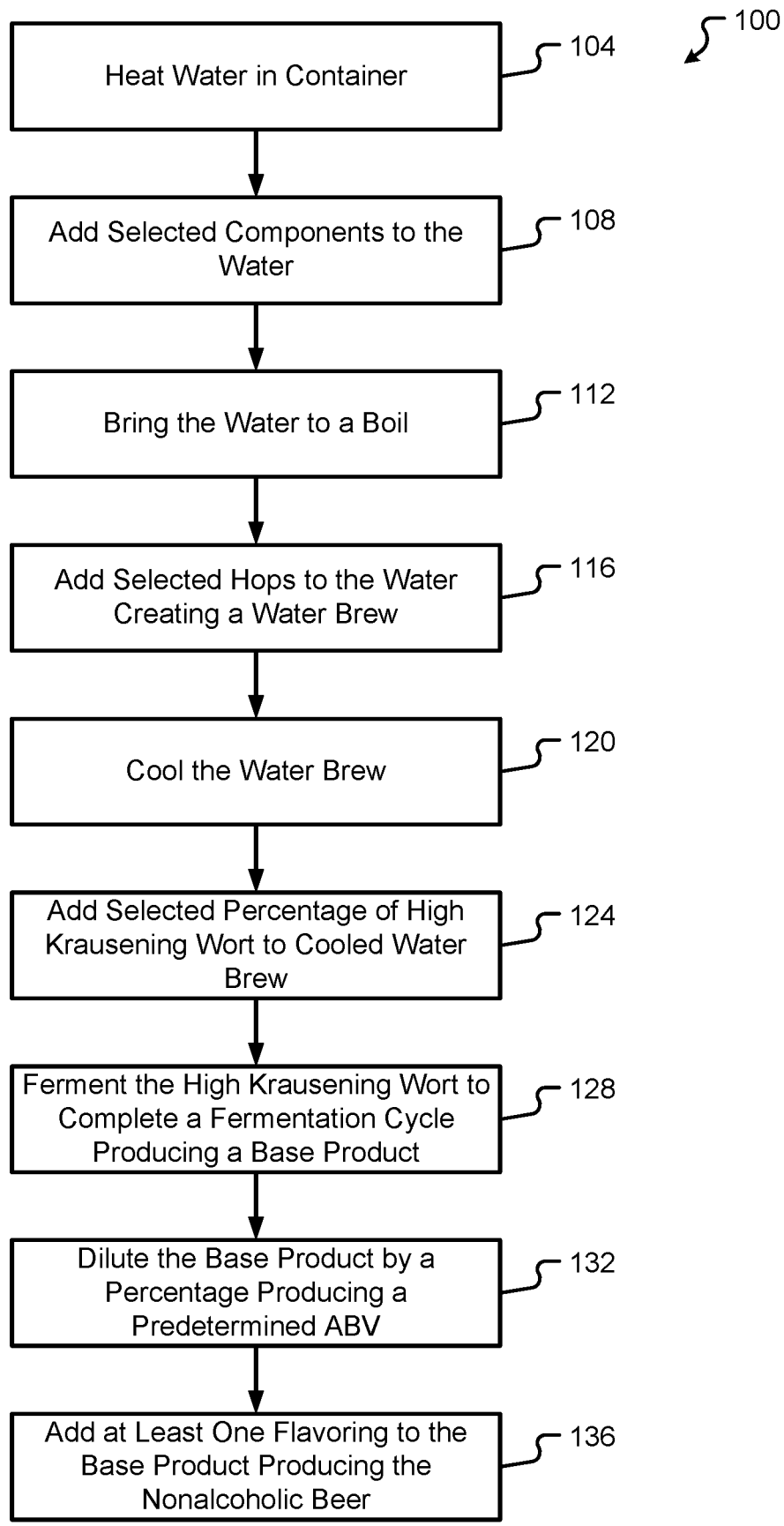

METHOD OF BREWING NON-ALCOHOLIC BEER

CROSS REFERENCE TO RELATED APPLICATION

This application is a national stage application under 35 U.S.C. 371 and claims the benefit of PCT Application No. PCT/US2020/059300 having an international filing date of 6 Nov. 2020, which designated the United States, which PCT application claimed the benefit of and priority, under 35 U.S.C. § 119 (e), to U.S. Provisional Application Ser. No. 62/933,035, filed Nov. 8, 2019, entitled "Method of Brewing Non-Alcoholic Beer," the entire disclosures of each of which are hereby incorporated herein by reference, in their entireties, for all that they teach and for all purposes.

BACKGROUND

The present disclosure is generally directed to the brewing of malt beverages, and more particularly, to a method of brewing a nonalcoholic beer wherein fermenting is conducted with a low percentage of high krausening wort within a water brew containing hops.

The natural process of brewing beer involves the creation of alcohol within the beverage. Alcohol is a desirable characteristic of beer, however within recent times, a market has developed for nonalcoholic beers. The term "nonalcoholic beer" refers to a brewed malt-based beverage containing 0.5% or lower ethyl alcohol by volume.

The alcohol in beer is produced by fermenting wort with yeast. Wort is a solution produced by mashing grains, typically ground-up barley malt, with or without additional fermentable ingredients such as corn or rice. The solution is prepared in a large quantity of hot water in which the barley malt and other adjuncts are mashed to extract sugars and other soluble substances such as low molecular proteins and polysaccharides. Hops are added to the wort as it is boiled to provide the desired bitterness that is a characteristic flavor component of beer.

In traditional brewing processes, after the wort is prepared, it is pitched with yeast and allowed to ferment for several days until the yeast has consumed all or substantially all the fermentable extract in the wort. As the fermentation proceeds, most of the fermentable carbohydrates are converted by the yeast into ethyl alcohol and carbon dioxide. Other additives may be added to the wort order to enhance the flavor of the resultant beverage. After filtering and finishing, the resultant beverage is the desired beer.

The flavor of beer may be considered as having three essential components: bitterness contributed by the hops, the flavor of the constituents from the barley malt that are not digested by the yeast in fermentation, and aroma components that are fermentation byproducts contributed by the yeast. Most of the known brewing process for nonalcoholic beer compromise or alter at least one of the flavor components because the processes either substitute or hinder normal brewing processes as compared to brewing regular beer.

Despite what may seem as a relatively simple process for brewing beer, the chemical processes that take place to create a distinctive malt-based beverage, and one that may be repeated with high quality and consistency, require significant production controls. Even the slightest variations in components and processing will result in a brewed beverage that has its own unique characteristics, and which may differ from the desired product.

There are numerous methods of producing nonalcoholic beer, but most suffer from significant drawbacks. One well known method is to complete the brewing process and then attempt to remove the ethyl alcohol to reduce the alcohol content to at or below the 0.5% threshold. Alcohol removal, from an equipment and labor standpoint, is extremely expensive. Further, because the beer is typically heated to boil off or evaporate the alcohol, this additional heating has a degrading effect on the taste of the beer wherein the delicate balance of beer constituents are disrupted.

Another well-known method is to arrest the fermentation process, or to use substitute microbials which do not produce ethyl alcohol or produce low levels of alcohol during fermentation. Disrupting or modifying fermentation will result in significantly different flavors that are produced as compared to the traditional brewing process in which the full lifecycle of yeast during fermentation adds necessary flavor and body to the brew. This method also tends to leave behind significant quantities of undesirable unfermented extract.

Another known method of producing nonalcoholic beer is through cold contact brewing. Generally, cold contact brewing involves pitching wort with a yeast slurry and then fermenting the pitched wort at a relatively cool temperature (such as about 5° C.) for a monitored period of time. The cooler temperature during brewing slows down reproduction of the yeast and therefore, reduces alcohol content as compared to a traditional fermentation in which the pitched wort is allowed to ferment at a much higher temperature. This method, like arrested fermentation, also tends to leave behind significant quantities of undesirable unfermented extract.

One example of a prior art reference which discloses a process for preparing a nonalcoholic malt beverage is disclosed in the U.S. Pat. No. 4,970,082. This reference discloses four basic process steps for preparing the beverage: (1) producing a wort having a high extract concentration that includes fermentable sugars (concentration of between 14-20%) (2) obtaining a yeast slurry from a previous ordinary beer fermentation in which the slurry contains 10-20% yeast solids and the remainder beer: (3) pitching the wort with the yeast slurry; and (4) fermenting the pitched wort for 30 min. to 10 hours at about 3° C.-7° C., resulting in a beverage having an alcoholic concentration of about 1% to 2%. The concentration is subsequently reduced to less than 0.5% by dilution of carbonated water. This method also results in significant quantities of remaining unfermented extract.

BRIEF SUMMARY

Despite the plethora of references that may disclose various methods for producing a nonalcoholic beer, there is still a need for a method in which the resultant beverage has a superior flavor and one which is clearly identifiable as a quality beer despite the reduced alcohol content. There is also a need for a method in which the process itself is relatively simple and repeatable, thereby minimizing cost and reducing production controls.

In view of the foregoing, it is one object of the present disclosure to provide a method of producing a nonalcoholic beverage having a true, distinctive beer flavor. It is yet another object of the present disclosure to produce the nonalcoholic beverage with a flavor that departs from many existing nonalcoholic beers which may be generally categorized as being over-sweet and/or excessively "worty" in taste.

A method of the present disclosure begins with producing a "hop tea" or "water brew." First, water is heated within a bulk container such as a kettle. Additions are added to the water including components such as salts and acids. For example, mineral salts and lactic acid may be added to bring the water brew to a pH of between about 4.0 to 4.5. These salts and acids may serve several functions to not only balance the pH of the solution, but to also add electrolytes and to otherwise condition the water in preparation for subsequent brewing.

The water brew is brought to a boil and then hops may be added. Both bittering hops and aroma/flavoring hops may be added in which the bitterness of the water brew is brought up to between about 20 to 40 International Bitterness Units (IBUs).

Next, the water brew is cooled to about 10° C. and placed in a fermenter. The cooled water brew is then pitched with 10-15% high krausening wort. This fermenting wort is chosen when at the high krausen stage or point; which means that fermenting times can vary, but a typical range is between about 20-36 hours after the fermenter is fully loaded and there is full yeast activity, i.e., the high krausen stage is peaking.

High krausening fermenting wort is chosen because test trials indicate this early stage of fermentation provides yeast cells in a preferred stage of cell development that create a wide range of flavors having beer-like properties that are captured within the water brew solution. Specifically, more aromatic flavors are captured when high krausening wort is selected. Contrast selection of high krausening wort to later stages of fermentation in which many flavor compounds are lost or "scrubbed out" of the solution as carbon dioxide continues to be produced in the fermentation cycle. Further, choosing fermenting wort prior to the high krausen stage develops undesirable flavors. One visual indication of the high krausen stage is the highest or greatest yeast foam being produced. Accordingly, adding fermenting wort prior to the water brew prior to formation of the maximum foam or after the foam begins to collapse, does not provide the same high soluble levels of desirable flavors being retained in the liquid solution to contribute to final base characteristics.

The high krausen stage is measurable through assessment of YIS (yeast in suspension) Yeast cell counts increase due to cell replication from the point of fermenter filling when yeast is pitched to the wort and cell counts are at 16 million cells/ml. The YIS counts top out at the high krausen stage with around 70 million cells. As the yeast foam collapses after the high krausen state, the YIS counts quickly decrease as well. Regular YIS testing can be used when the high krausen stage occurs without requiring visual confirmation.

The 10-15% amount of high krausening wort combined with the water brew is enough to achieve about a 1% ABV in which the fermentation is permitted to proceed to completion. Accordingly, the fermentation is not arrested as in many other methods of brewing. Because of the relatively small amount of krausening wort that is added to the water brew, fermentation in the present method does not achieve the much higher ABV values found in regular beer fermentation processes, yet the flavor benefits of a complete fermentation cycle is maintained since fermentation is not arrested. The yeast are allowed to proceed through their normal life cycle and produce fermentation flavors akin to what they produce in a normal alcoholic fermentation cycle.

After fermentation is completed, the product is diluted by a factor of 2 with carbonated water or a deaerated brewing liquor to reduce the ABV to just below 0.5%.

More preferably, the fermentation is completed to an end attenuation of approximately 0.95% ABV and the dilution brings the product to approximately 0.42% ABV.

The product at this stage can be referred to as the "base." From a taste perspective, the base is a very clean, dry, and light carbonated beverage with an easily recognizable beer flavor, but without some finished beer qualities such as those that round out the body and aroma in an alcoholic beer.

Flavoring may be added to the base to include flavoring agents such as malt extracts, selected individual flavorings, aroma components and corn sweeteners. Corn sweeteners and malt extract add body or viscosity to the base. It is also contemplated that other flavors may be added to include new flavors which provide a taste sensation of alcohol.

Considering the above described features and attributes, in one aspect, embodiments of the present disclosure may comprise a method of brewing a nonalcoholic beer comprising: heating water within the container; adding selected components to the water including at least one salt or at least one acid; bringing the water to a boil; adding selected hops to create a water brew; cooling the water brew; adding a selected percentage of a high krausening wort to the cooled water brew; fermenting the wort to complete the fermentation cycle to produce a base product; diluting the base product; and adding at least one flavoring to the base product to produce the finished nonalcoholic beer.

There are numerous benefits to the method of the present disclosure described herein. First, for example, the controlled fermentation cycle avoids a requirement to remove alcohol which, in existing alcohol removing processes, is extremely expensive because of the equipment required. Second, the controlled fermentation still enables completion of a full fermentation cycle thereby providing taste benefits relating to a distinctive beer flavor achieved in regular brewing processes. Further, the controlled fermentation may still use a selected brewer's yeast as opposed to immobilized yeast or substitute microbials which may otherwise add considerable expense to the brewing process.

Additional features and advantages are described herein and will be apparent from the following Description and figure.

BRIEF DESCRIPTION OF THE DRAWINGS

FIG. 1 is a flow diagram depicting a method of brewing a nonalcoholic beer in accordance with embodiments of the present disclosure.

DETAILED DESCRIPTION

Embodiments of the present disclosure will be described in connection with a method of brewing nonalcoholic beer wherein fermenting is achieved with a high krausening wort added to a hop tea or water brew. The term "high krausening" as defined herein may refer to the phase of fermentation when the wort reaches the peak of the fermentation cycle, that is, the peak of the reproduction of the yeast. The high krausen stage is visually observable, and is characterized by a large billowing head of foam that forms on the surface of the fermenting beverage. When the reproduction of the yeast slows, the head of foam also subsides which provides another visual indication of the advancing krausening stages. The low krausen stage, may be visually characterized by a dense, cream-like and relatively uniform head of foam. The head of foam is white in color at first, but then carbon dioxide bubbles congregate particulates from the wort causing the foam to then develop yellowish brown colored tips.

In some embodiments, the method of brewing nonalcoholic beer is optimized with use of the high krausening wort because, among other things, transferring the high krausening wort to the water brew at this stage in the fermentation cycle results in the maximum flavor benefits.

FIG. 1 is a flow diagram depicting a method 100 of brewing a nonalcoholic beer in accordance with embodiments of the present disclosure. In one embodiment, the method 100 begins with the production of the hop tea or water brew in which water is heated within a bulk container (step 104). The water brew is conditioned to achieve a desired pH level and to otherwise condition the water in preparation for receiving the high krausening wort. For instance, at least one of salts and acids may be added to the water to balance the pH of the solution, to add electrolytes, among other reasons (step 108). One preferred range for the pH of the water brew is between about 4.0-4.5. In some embodiments, the water brew may be completely absent of yeast.

Next, the method 100 continues by bringing the water brew to a boil (step 112), and then selected hops may be added for flavoring (step 116). In some embodiments, bittering hops and/or aroma or flavoring hops may be added in which the water brew is brought to a selected bitterness. According to one embodiment, the bitterness of the water brew may be brought to a bitterness measurement of about 20 to 40 IBUs.

Other additions beyond a range of mineral salts, acids and hops are contemplated dependent upon the outcome desired for the base liquid. For example, in another embodiment, additions could further include a cold mash (cold brew) of malts and barleys (or alternatively oat) resulting in addition of beta-glucan soluble fibers. These fibers contribute a certain roundness of body to the mouthfeel due to the impact of the beta-glucan, which are complex carbohydrate gums to create a somewhat viscous solution at higher concentrations.

A next step in the method 100 is to cool the water brew to approximately 10° C. and place the water brew in a fermenter (step 120). At this point, the water brew is pitched with 10-15% of high krausening wort obtained from another fermenting vessel (step 124). Stated another way, the high krausening wort may be pitched at 10% to 15% of the water brew volume. As mentioned, the high krausening wort is obtained by visual inspection; however, other means may be incorporated to retrieve the high krausening wort at a desired fermentation point. In some embodiments, the high krausening wort may be added to the cooled water brew without boiling the high krausening wort.

The high krausening wort and water brew are allowed to ferment for approximately 5 to 7 days which is adequate time to enable fermentation to proceed to completion (step 128). Accordingly, the fermentation is not arrested and all the flavor benefits achieved with the completed fermentation cycle are obtained. Contrast completed fermentation of the present disclosure as compared to arrested fermentation that halts the yeast in mid-life-cycle, typically prior to the cells completing their normal replication cycles. Arrested fermentation has disadvantages displayed in a range of undesirable flavors commonly described as worty, raw grain, sulfury, yeasty or green beer flavors. Further, arrested fermentation often leaves behind a high level of unfermented constituents that make for a quite sweet liquid that is not normal (typical) for light lager beers.

After fermentation is completed, the product is diluted by a factor of 2 with the carbonated water or the deaerated brewing liquor to reduce the ABV to a desired percentage, such as below 0.5%, and more preferably to approximately 0.42% ABV (step 132).

Although pitching the water brew with the 10-15% of the high krausening wort is selected in accordance with one embodiment of the present disclosure, it is also contemplated that other percentages of the high krausening wort may be selected resulting in different percentages of ABV being produced. The 10-15% range results in the ABV being approximately 1%, which is a convenient percentage for dilution by the factor of two to therefore bring the ABV to just below the 0.5% level.

The resultant base product may be further conditioned to receive desired flavoring agents to include malt extracts, selected individual flavoring components, and corn sweeteners (step 136). Malt extract and corn sweeteners add body or viscosity to the base, and may be used to sweeten the product as well. Special other flavors may be added, such as a flavor which may provide a taste sensation of alcohol.

The methods described herein provide many advantages over existing methods for brewing nonalcoholic beer. The controlled fermentation cycle avoids requirements to remove alcohol which add significant costs because of required equipment. The controlled yet completed fermentation cycle provides superior taste benefits corresponding to the distinctive beer flavors achieved in regular brewing processes. The controlled fermentation still enables a selected brewer's yeast as opposed to immobilized yeast or substitute microbials which may add considerable expense to the brewing process and may degrade the flavor of the end product.

Although the embodiments of the present disclosure are described with respect to one or more preferred embodiments herein, it shall be understood that present disclosure is not limited to these specific embodiments and may be modified in accordance with the scope of the claims appended hereto.

The exemplary systems and methods of this disclosure have been described in relation to nonalcoholic beverages and efficient processes for making the same. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

While the flowchart has been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method of brewing a nonalcoholic beer, comprising: heating water within a container; adding selected components to the water including at least one salt or at least one acid; bringing the water to a boil; adding selected hops to create a water brew; cooling the water brew; adding a selected percentage of a high krausening wort to the cooled water brew; fermenting the wort to complete a fermentation cycle to produce a base product; diluting the base product by a percentage to thereby produce an alcohol by volume (ABV) to at or below 0.5%; and adding at least one flavoring to the base product to produce the nonalcoholic beer.

Aspects of the above method further comprise: adding the selected components to bring the water to a pH between about 4.0 to 4.5. Aspects of the above method further comprise: adding the selected hops including at least one bittering hop or one aroma/flavoring hop. Aspects of the above method include wherein the water brew is brought to between about 20 to 40 International Bitterness Units (IBUs) by adding the selected hops. Aspects of the above method include wherein the water is cooled to approximately 10° C. Aspects of the above method include wherein the high krausening wort is pitched between about 10-15%. Aspects of the above method include wherein fermentation of the high krausening wort, prior to transfer to the water brew, is between about 20-36 hours. Aspects of the above method include wherein an amount of the high krausening wort is added to achieve about 1% ABV when the high krausening wort is fermented for a complete fermentation cycle. Aspects of the above method include wherein the flavorings added include at least one of a malt extract, a selected individual flavoring component, or a corn sweetener. Aspects of the above method include wherein fermenting the wort takes between about 5-7 days. Aspects of the above method include wherein the water brew does not include, or is absent of, any yeast. Aspects include a nonalcoholic beer produced using the above method.

Embodiments include a method of brewing a nonalcoholic beverage, comprising: producing a water brew by combining water, hops, and at least one of a salt and an acid in a container, the water brew being completely absent of yeast; bringing the water brew to a boil in the container; cooling, after bringing the water brew to the boil, the water brew to a cooled temperature; transferring the cooled water brew to a fermenter; adding a predetermined amount of high krausening wort to the cooled water brew in the fermenter; fermenting, by the fermenter, the predetermined amount of high krausening wort and the cooled water brew for a predetermined amount of time producing a beverage base product; and diluting the beverage base product with an amount of fluid producing the nonalcoholic beverage having an alcohol by volume (ABV) of less than 0.5%.

Aspects of the above method further comprise: adding at least one flavoring to the nonalcoholic beverage comprising at least one of malt extract and sweetener. Aspects of the above method include wherein the water brew is produced with the combination of water, hops, and at least one of the sale and the acid producing a pH between from 4.0 to 4.5, wherein the hops comprise at least one of a bittering hop and an aroma hop, and wherein a bitterness measurement of the water brew is between 20 to 40 International Bitterness Units (IBUs). Aspects of the above method include wherein the cooled temperature is approximately 10° C., wherein the predetermined amount of high krausening wort is between 10% to 15% of a total volume of the cooled water brew, and wherein the predetermined amount of time is between 5 to 7 days. Aspects of the above method include wherein prior to adding the predetermined amount of high krausening wort to the cooled water brew, the method further comprises: fermenting the predetermined amount of high krausening wort and the cooled water brew for 20 to 36 hours. Aspects of the above method include wherein the predetermined amount of high krausening wort to the cooled water brew is added to the cooled water brew when a full yeast activity at a high krausen stage is peaking. Aspects include a nonalcoholic beverage produced using at least one method above.

Embodiments include a method of brewing a nonalcoholic beer, comprising: producing a water brew by combining water, hops, and at least one of a salt and an acid in a container, the water brew being completely absent of yeast and having a pH between 4.0 to 4.5; bringing the water brew to a boil in the container; cooling, after bringing the water brew to the boil, the water brew to approximately 10° C.; transferring the cooled water brew to a fermenter; adding high krausening wort to the cooled water brew in the fermenter totaling between 10% to 15% of a volume of the cooled water brew; fermenting the predetermined amount of high krausening wort in the cooled water brew for at least three days producing a beverage base product; diluting the beverage base product using at least one of carbonated water and deaerated brewing liquor to reach an alcohol by volume (ABV) of the beverage base product of less than 0.5%; and adding at least one flavoring comprising at least one of malt extract and sweetener to the diluted beverage base product producing the nonalcoholic beer.

Aspects of the above method include wherein prior to adding the high krausening wort to the cooled water brew, the method further comprises: fermenting the high krausening wort for 20 to 36 hours. Aspects of the above method include wherein prior to diluting the beverage base product with the amount of water, the beverage base product has an ABV of approximately 1%. Aspects of the above method include wherein the high krausening wort is added to the cooled water brew in the fermenter without boiling the high krausening wort. Aspects include a nonalcoholic beer produced using at least one of the methods above.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

What is claimed is:

1. A method of brewing a nonalcoholic beer, comprising:
heating water within a container;
adding components to the water, the components including at least one salt or at least one acid;
bringing the water including the components to a boil;
adding hops to the water including the components to create a water brew;
cooling the water brew;
adding a high krausening wort to the cooled water brew without boiling the high krausening wort;
fermenting the high krausening wort and the cooled water brew to complete a fermentation cycle to produce a base product;
diluting the base product by a percentage to thereby produce an alcohol by volume (ABV) to at or below 0.5%; and
adding at least one flavoring to the base product to produce the nonalcoholic beer, wherein an amount of the high krausening wort is added to achieve about 1% ABV when the high krausening wort and the cooled water brew is fermented for the complete fermentation cycle.

2. The method of claim 1, further comprising:
adding the components to bring the water to a pH between about 4.0 to 4.5.

3. The method of claim 1, further comprising:
adding the hops including at least one bittering hop or one aroma/flavoring hop.

4. The method of claim 3, wherein the water brew is brought to between about 20 to 40 International Bitterness Units (IBUs) by adding the hops.

5. The method of claim 1, wherein the water brew is cooled to approximately 10° C.

6. The method of claim 1, wherein the high krausening wort is between about 10-15% of a total volume of the cooled water brew.

7. The method of claim 1, wherein fermentation of the high krausening wort, prior to adding the high krausening wort to the cooled water brew, is between about 20-36 hours.

8. The method of claim 1, wherein the at least one flavoring added includes at least one of a malt extract, an individual flavoring component, or a corn sweetener.

9. The method of claim 1, wherein fermenting the high krausening wort takes between about 5-7 days.

10. A method of brewing a nonalcoholic beverage, comprising:
producing a water brew by combining water, hops, and at least one of a salt and an acid in a container, the water brew being completely absent of yeast;
bringing the water brew to a boil in the container;
cooling, after bringing the water brew to the boil, the water brew to a cooled temperature;
transferring the cooled water brew to a fermenter;
adding a high krausening wort to the cooled water brew in the fermenter without boiling the high krausening wort;
fermenting, by the fermenter, the high krausening wort and the cooled water brew producing a beverage base product; and
diluting the beverage base product with an amount of fluid producing a nonalcoholic beverage having an alcohol by volume (ABV) of less than 0.5%, wherein prior to diluting the beverage base product, the beverage base product has an ABV of approximately 1%.

11. The method of claim 10, further comprising:
adding at least one flavoring to the nonalcoholic beverage comprising at least one of malt extract and sweetener.

12. The method of claim 11, wherein the water brew is produced with the combination of water, hops, and at least one of the salt and the acid producing a pH between from 4.0 to 4.5, wherein the hops comprise at least one of a bittering hop and an aroma hop, and wherein a bitterness measurement of the water brew is between 20 to 40 International Bitterness Units (IBUs).

13. The method of claim 12, wherein the cooled temperature is approximately 10° C., wherein the high krausening wort is between 10% to 15% of a total volume of the cooled water brew, and wherein the high krausening wort and the cooled water brew is fermented for 5 to 7 days.

14. The method of claim 13, wherein prior to adding the high krausening wort to the cooled water brew, the method further comprises:
fermenting the high krausening wort for 20 to 36 hours.

15. The method of claim 14, wherein the high krausening wort is added to the cooled water brew when a full yeast activity at a high krausen stage is peaking.

16. A method of brewing a nonalcoholic beer, comprising:
producing a water brew by combining water, hops, and at least one of a salt and an acid in a container, the water brew being completely absent of yeast and having a pH between 4.0 to 4.5;
bringing the water brew to a boil in the container;
cooling, after bringing the water brew to the boil, the water brew to approximately 10° C.;
transferring the cooled water brew to a fermenter;
adding a high krausening wort to the cooled water brew in the fermenter totaling between 10% to 15% of a volume of the cooled water brew without boiling the high krausening wort;
fermenting the high krausening wort in the cooled water brew for at least three days producing a beverage base product;
diluting the beverage base product using at least one of carbonated water and deaerated brewing liquor to reach an alcohol by volume (ABV) of the beverage base product of less than 0.5%; and
adding at least one flavoring comprising at least one of malt extract and sweetener to the diluted beverage base product producing the nonalcoholic beer, wherein prior to diluting the beverage base product, the beverage base product has an ABV of approximately 1%.

17. The method of claim 16, wherein the high krausening wort is fermented for 20-36 hours prior to being added to the cooled water brew.

\* \* \* \* \*